(12) United States Patent
Yu et al.

(10) Patent No.: US 7,865,822 B2
(45) Date of Patent: Jan. 4, 2011

(54) METHOD AND APPARATUS FOR PARALLEL VALIDATION OF DOCUMENTS

(75) Inventors: Zhiqiang Yu, Shanghai (CN); Jianhui Li, Shanghai (CN); Xianfeng Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 823 days.

(21) Appl. No.: 11/812,279

(22) Filed: Jun. 18, 2007

(65) Prior Publication Data

US 2008/0313212 A1 Dec. 18, 2008

(51) Int. Cl.
*G06F 17/00* (2006.01)

(52) U.S. Cl. ...................... 715/234; 715/255
(58) Field of Classification Search .......... 715/234, 715/236, 237, 200, 255; 707/811
See application file for complete search history.

(56) References Cited

U.S. PATENT DOCUMENTS

| | | | | |
|---|---|---|---|---|
| 7,117,504 | B2 * | 10/2006 | Smith et al. | 719/328 |
| 7,665,015 | B2 * | 2/2010 | Dignum et al. | 715/234 |
| 7,665,016 | B2 * | 2/2010 | Behrens et al. | 715/237 |
| 2004/0010754 | A1 * | 1/2004 | Jones | 715/513 |
| 2004/0060004 | A1 * | 3/2004 | Mani et al. | 715/513 |
| 2005/0097455 | A1 * | 5/2005 | Zhou et al. | 715/513 |
| 2005/0188364 | A1 * | 8/2005 | Cockx et al. | 717/159 |
| 2006/0236225 | A1 * | 10/2006 | Achilles et al. | 715/513 |
| 2006/0265593 | A1 * | 11/2006 | Momma et al. | 713/176 |
| 2007/0239749 | A1 * | 10/2007 | Farahbod | 707/101 |

* cited by examiner

*Primary Examiner*—Laurie Ries
(74) *Attorney, Agent, or Firm*—Pearl Cohen Zedek Latzer LLP

(57) ABSTRACT

A method for validating a document by fragmenting the document, validating elements fully contained in each single fragment and validating elements spanning two or more fragments.

13 Claims, 4 Drawing Sheets

```
ValSum = {}
ValStack ={}
isFirstElement = true;

For each event in document fragment {
    Switch (event's type)
        case start_element :{
            ValSumItem = {"item_type" = Element, "dg_id" = element's dg_id};

if (ValStack isn't empty) {
                if ((isFirstElement == true) AND (hasRootElement == true)) {
                    // it is the root element , do nothing.
                }
                else{
                    // parent is in the same fragment
                    // get its parent element and validate its parent element's content model
                    Parent_in_same_fragment = true
                    Parent_elem_type = ValStack.top(). elem_type
                    Current_ctx = ValStack.top(). elem_val_ctx
                    ValStack.top(). elem_val_ctx = validate(parent_elem_type, current_ctx, element's qualified name)
                }
            }else{
                //parent is not in the same document, add it into summary information
                Add ValSumItem to ValSum
            }
            // get current element's type according to element's dataguide Id
            current_elem_type = getType(element's dataguid id, grammar, DGList)
            attribute_list = getAttributeList(event)
            validateAttributes(current_elem_type, attribute_list)

// add the initial state and the FSM into validation stack
            PVElem = { "elem_info" = ValSumItem, "elem_val_ctx" = initial context, "elem_type" = current_elem_type
            }
            push PVElem to ValStack
            isFirstElement = false
            Break;
        Case end_element:{
            if (ValStack isn't empty){
                //start element is in the same fragment
                PVElem = ValStack.pop();
                //check if it's in final state
                check(PVElem.elem_type, PVElem.elem_val_ctx);
            }else
            {
                //start element is not in the same fragment
                ValSumItem = {"item_type" = endElement };
                Add ValSumItem to ValSum
            }
            Break;
        }
        Case chardata:{
            if (ValStack isnt' empty) {
                //parent is in the same fragment
                PVElem = ValStack.top();
                current_ctx = PVElem. elem_val_ctx;
                PVElem.elem_val_ctx = validate(PVElem.elem_type, current_ctx, chardata)
            }
            else
            {
                //parent is not in the same fragment
                ValSumItem = {"item_type" = chardata ,"value" = text value};
                Add ValSumItem to ValSum
            }
            Break;
        }
    }
    Put all the PVElem of ValStack into PVElemList
}
```

```
ValSum = {}
ValStack ={}
isFirstElement = true;

For each event in document fragment {
    Switch (event's type)
        case start_element :{
            ValSumItem = {"item_type" = Element, "dg_id" = element's dg_id};

if (ValStack isn't empty) {
                if ((isFirstElement == true) AND (hasRootElement == true)) {
                    // it is the root element , do nothing.
                }
                else{
                    // parent is in the same fragment
                    // get its parent element and validate its parent element's content model
                    Parent_in_same_fragment = true
                    Parent_elem_type = ValStack.top(). elem_type
                    Current_ctx = ValStack.top(). elem_val_ctx
                    ValStack.top(). elem_val_ctx = validate(parent_elem_type, current_ctx, element's qualified name)
                }
            }else{
                //parent is not in the same document, add it into summary information
                Add ValSumItem to ValSum
            }
            // get current element's type according to element's dataguide id
            current_elem_type = getType(element's dataguid id, grammar, DGList)
            attribute_list = getAttributeList(event)
            validateAttributes(current_elem_type, attribute_list)

// add the initial state and the FSM into validation stack.
            PVElem = { "elem_info" = ValSumItem, "elem_val_ctx" = initial context, "elem_type" = current_elem_type
            }
            push PVElem to ValStack
            isFirstElement = false
            Break;
        Case end_element:{
            if (ValStack isn't empty){
                //start element is in the same fragment
                PVElem = ValStack.pop();
                //check if it's in final state
                check(PVElem elem_type, PVElem elem_val_ctx);
            }else
            {
                //start element is not in the same fragment
                ValSumItem = {"item_type" = endElement };
                Add ValSumItem to ValSum
            }
            Break;
        }
        Case chardata:{
            if (ValStack isnt' empty) {
                //parent is in the same fragment
                PVElem = ValStack.top();
                current_ctx = PVElem. elem_val_ctx;
                PVElem.elem_val_ctx = validate(PVElem.elem_type, current_ctx, chardata)
            }
            else
            {
                //parent is not in the same fragment
                ValSumItem = {"item_type" = chardata ,"value" = text value};
                Add ValSumItem to ValSum
            }
            Break;
        }
    }
    Put all the PVElem of ValStack into PVElemList
}
```

Fig. 3

```
finished = false;
PVElem = PVElemList.top();
For (i = 0; i < valSum.size(); i++){
    ValSumItem = ValSum[i];
    Switch(ValSumItem type){
      Case Element:
      Case charData:
          current_ctx = PVElem. elem_val_ctx;
          PVElem elem_val_ctx = validate(PVElem.elem_type, current_ctx, ValSumItem)
          Break;
      Case endElement:
          //Check PVEItem is in final state
          check(PVElem.elem_type, PVElem.elem_val_ctx);

// this element has finished the validation, so pop it from the partial element list
          PVElemList.pop();

If (PVElemList is Empty){
             finished = true;
          }
          else{
              // get the next PVElem from the partial validated element list
              PVElem = PVElemList.top();
          }

Break;
    }

If (finished == true)
       Break;
}
```

Fig. 4

METHOD AND APPARATUS FOR PARALLEL VALIDATION OF DOCUMENTS

BACKGROUND OF THE INVENTION

Markup languages such as Hypertext Markup Language (HTML), Standard Generalized Markup Language (SGML) and Extensible Markup Language (XML) are essential building blocks of technologies such as Service Oriented Architecture (SOA), Web services and the Internet. The wide acceptance of markup languages enables data communication across differing platforms, operating systems, web browsers, web and application servers and network equipment.

Validation of markup language documents, such as XML documents, may be used, among other things, to avoid undesired input and/or prevent malicious attacks. However, validation may degrade performance through consumption of time, memory and computing power.

BRIEF DESCRIPTION OF THE DRAWINGS

Embodiments of the invention are illustrated by way of example and not limitation in the figures of the accompanying drawings, in which like reference numerals indicate corresponding, analogous or similar elements, and in which:

FIG. 3 shows pseudo code implementing some embodiments of the invention; and FIG. 4 shows pseudo code implementing some embodiments of the invention;

Figure 1:
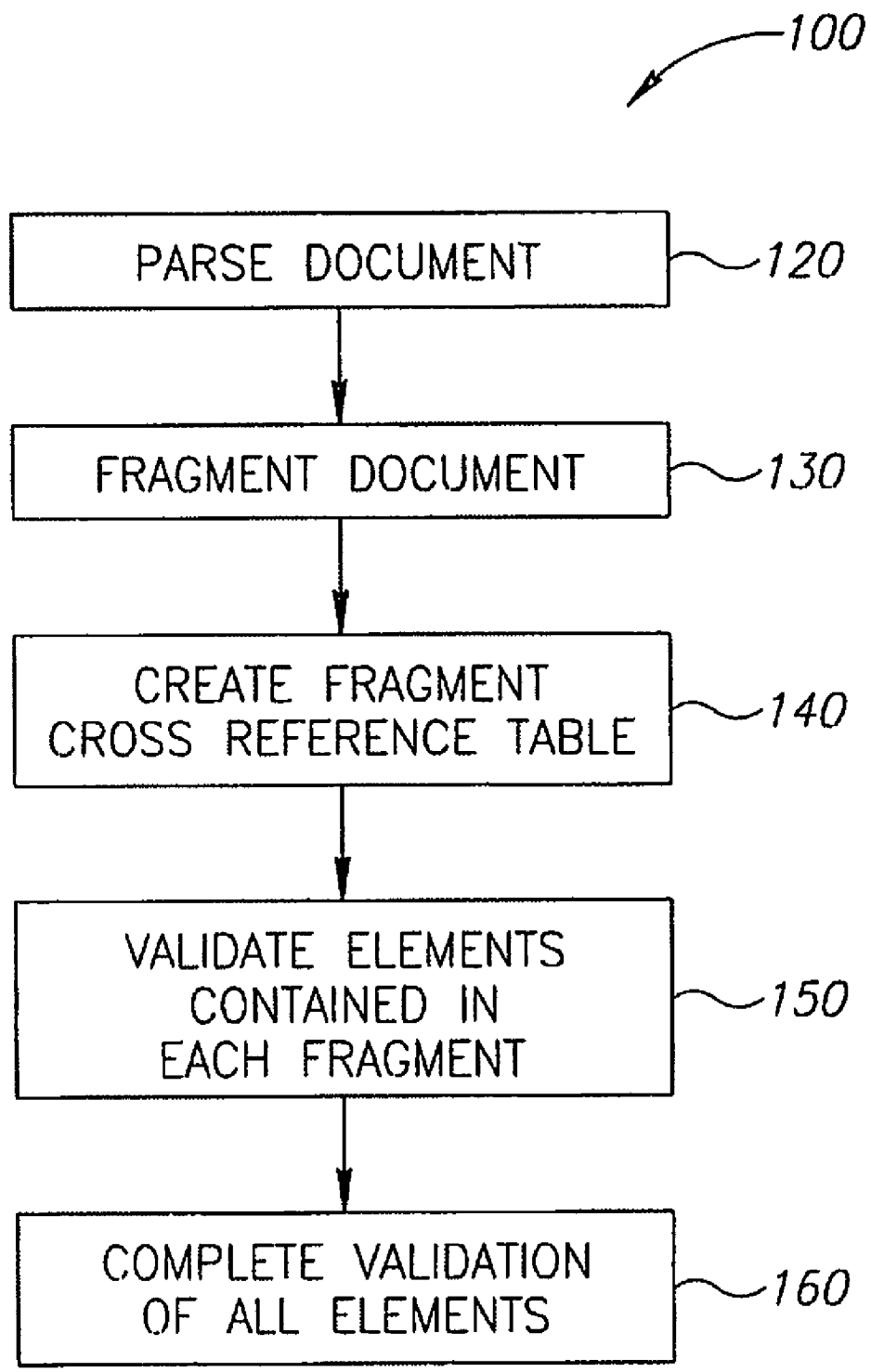
FIG. 1 is a schematic flow diagram showing relevant functional components of an exemplary method of parallel validation according to some embodiments of the invention.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the embodiments of the invention.

An operational process on data is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. This apparatus may be specially constructed for the desired purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general purpose systems may be used with programs in accordance with the teachings herein, or it may prove convenient to construct a more specialized apparatus to perform the desired method The desired structure for a variety of these systems will appear from the description below In addition, embodiments of the present invention are not described with reference to any particular programming language. It will be appreciated that a variety of programming languages may be used to implement the teachings of the invention as described herein.

Validation of a document may refer to the process of determining whether the structure, content, and/or data types of a document's elements are valid, as well as verifying compliance to schema, semantics and/or rules dictated by a language, for example XML. It will be understood that embodiments of the present invention may be applied to a document written in any programming language, and in particular to any markup programming language, including, for example, hypertext markup language (HTML), standard generalized markup language (SGML), extensible markup language (XML), extensible hypertext markup language (XHTML), extensible stylesheet language (XSL), and XML linking language (XLL). Documents in other programming languages or formats may be processed in accordance with embodiments of the present invention.

In accordance with embodiments of the present invention, parallel validation of a document, e.g., independent validation of portions of the document, simultaneously or sequentially, or both, may accelerate the validation process as well as possibly reduce memory consumption of the validation process. Some embodiments of the invention may enable parallel validation of documents such as XML, documents, for example, by dividing a document into fragments, and validating the resulting document fragments simultaneously or sequentially in parallel.

Reference is now made to FIG. 1 which is a functional flowchart diagram 100 illustrating an implementation of parallel validation according to some embodiments of the invention. Block 120 may represent parsing a document, for example, an XML document, comprising elements to be validated. Parsing may include identifying elements in the document. In some embodiments of the invention, identifying elements in the document may include determination of offsets of start and end tags within the document, as well as possibly resolving element names and/or element attributes in the document. Block 120 may use the dataguide technique for deriving an ancestor chain of elements contained in the document. The ancestor chain of a given element may be an ordered list of parent elements from that element to the root element, which, in combination with the attributes of a given element, may enable rapid determination of the type of the element. Block 120 may compute an element descriptor for each element in the document. In some embodiments of the invention, the element descriptor may contain the element's ancestor chain, as well as the element's attributes, and possibly other information pertaining to the element.

Block 130 may divide the document into a plurality of document fragments. It will be understood that in some embodiments of the invention, block 120 and block 130 may be united into a single functional block and/or may be performed together or simultaneously. According to some embodiments of the invention, fragmentation may be performed so that every fragment begins with a start tag of an element. Block 130 may further attach to each fragment the element descriptor of the first element contained in that fragment. The element descriptor which block 130 may attach to fragments may be used by block 140.

In embodiments of the invention, block 140 may create and/or update a fragment cross reference table. In embodiments of the invention, block 140 may record at least one entry in the cross reference table for each document fragment. In one embodiment of the invention, an entry in the cross reference table may contain, for example, fields including the element descriptor of the first element in a fragment, the element descriptor of the parent element of the first element in a fragment, and the qualified name of the parent element of the first element in the fragment, where qualified name may comprise local name and namespace name.

Figure 2A:
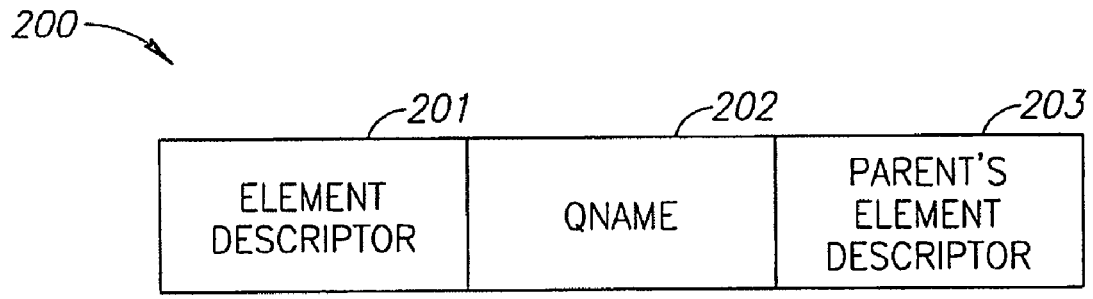
FIG. 2 shows an illustration of construction of entries in tables used by some embodiments of the invention.

FIG. 2A depicts a record 200 in an implementation of a fragment cross reference table in accordance with embodiments of the invention. The cross reference table record, may include an element descriptor field 201, containing an ancestor chain and attributes for the first element in the fragment; a qname field 202, representing the qualified name, including local name and namespace name of the parent element of the first element in the fragment; and a parent element descriptor 203, representing the element descriptor of the parent element of the first element in the fragment, where 0 may be used where an element has no parent, (e.g. root element). It will be understood that other data structures may be suitable in accordance with embodiments of the present invention.

Returning to FIG. 1, according to some embodiments of the invention, block 150 may perform validation of elements for each fragment. In some embodiments of the invention, block 150 may use information stored in the cross reference table in order to maintain the naming context though the validation process, for example, when an element is not wholly contained in a document fragment, e.g., when only one of the element's terminal tags is contained in the fragment document. For example, when an end tag of an element is contained in a fragment, but the start tag of that element is not contained the same fragment, block 150 may need to validate that the correct element is terminated by the end tag. Block 150 may further determine the new parent element's name. To accomplish these tasks, block 150 may retrieve the element descriptor from the fragment, locate the corresponding entry in the cross reference table and verify that the parent element's name therein matches the end tag met. Block 150 may further locate the entry in the cross reference table matching the parent's element descriptor and retrieving the new parent element's name.

According to some embodiments of the invention, block 150 may be implemented as a Finite State Machine (FSM). A FSM may keep state and context reflecting processing progress and state. Block 150 may record information regarding the state and context of the validation process of a fragment, for example, in a validation summary table.

Figure 2B:
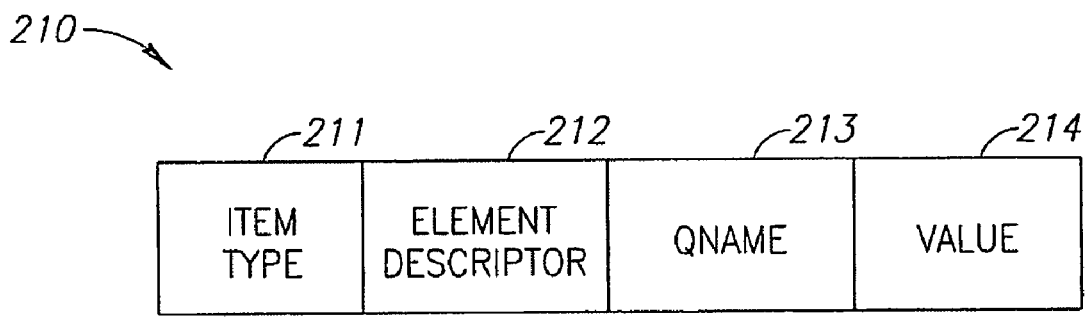
Figure 2C:
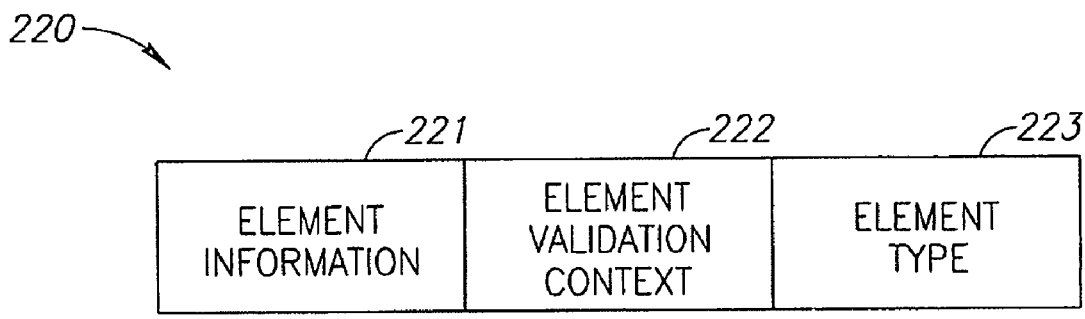

Reference is now made to FIGS. 2B and 2C showing data structures that may be used as records in a validation summary table in accordance with some embodiments of the invention. According to some embodiments of the invention, a validation summary table may include at least two sections for each validated fragment: fragment validation summary including validation summary item (ValSumItem) 210, and partial validation summary, including validation state of partially validated elements 220. Validation summary item 210 may include item type field 211, which may be an enumeration of {Element, endElement, attribute, chardata}; an optional element descriptor field 212, which may be applicable when the item type is an Element; an optional qname field 213, representing the qualified name, including local name and namespace name of the parent element of the first element in the fragment, which may be applicable when item type is attribute; and a value field 214, containing the value of the node, which may be applicable when the item type is an attribute or chardata.

It will be noted that in some embodiments of the invention, for a given element, if the parent element resides in the same document fragment, the element need not be recorded into the validation summary. Moreover, for item types chardata and attribute, those elements whose parent element resides in the same document fragment need not be recorded into the validation summary. In addition, if an end element tag is found, it may be recorded if and only if its corresponding start element tag is not in the same document fragment. Also, the qname field need not be recorded when recording an end element because the well-formness may be checked during the parse and/or fragment blocks, above. The end element tag record may be used to indicate when the element in the partial validation element list will be closed.

For example, if a document fragment contains the following data:

attr="attrvalue"> <A> <B attr2="attr2value">bbb</B> </A> </C><D>abc123, then the summary information of this document fragment may be:

---

{ ["item_type"=attribute,"qname"=attr,"value"=attrvalue],
["item_type"=Element,"element descriptor"=A's element descriptor],
["item_type"=endElement],
["item_type"=Element, "element descriptor"=D's element descriptor] }

---

It will be noted that in the above example, the line "item_type"=endElement refers to the </C> end tag. Also referred are element D which begins in the current fragment but ends in some consecutive fragment and the attributes tag which ends in the current fragment.

Reference is now made to FIG. 2C, which is a data structure 220 that may be used to implement a partial validation summary record (PVElem), including validation state of partially validated elements. Record 220 may include element information field 221, which may have item type ValSumItem 210 for an element whose validation was incomplete, for example, if its terminal tags were not both contained within the same document fragment. Accordingly, a subsequent document fragment that contains the end tag for the incompletely validated element may record its end element. Record 220 may also include element validation context field 222, which itself may include two parts The element validation context field 222 may include validation context of attributes, which may be applicable only or primarily when not all the element's attributes reside in the same document fragment. Context may include the currently validated attributes list, and part of attribute value, which may appear when attribute's value resides in two different document fragments. The element validation context field 222 may also include the validation context for child nodes. Since the validation of element's content (except for attributes) may be achieved via Finite State Machine (FSM), a state in the corresponding FSM may represent the validation context. Finally, record 220 may include an element type 223, which may be used to validate attributes and child nodes.

Accordingly, for the example document fragment provided above, containing the following data:

attr="attrvalue"> <A> <B attr2="attr2value">bbb</B> </A> </C><D>abc123, element C is terminated in this fragment, element D begins in this fragment. The partial validation element record 220 for the fragment may contain records for elements C and D with partially validated context. The validation summary 210 may also contain records of elements C and D.

Returning to FIG. 1, block 160 may complete validation of fragments only partially validated by block 150. Partial validation may occur when insufficient data in the fragment may prevent block 150 from completing the validation of all elements in the fragment, and may be performed, for example, using information recorded in the validation summary table, as described above.

Reference is now made to FIG. 3 which shows an exemplary pseudo code implementation of block 150, in accordance with some embodiments of the present invention. The code may output a partial validated element state entry (PVElemList) as shown by 210 in FIG. 2B and a fragment validation summary entry (ValSum) as shown by 220 in FIG. 2C.

According to some embodiments of the invention, block 150 may comprise multiple execution instances of a single software modules, each of which is capable of validating elements in a fragment. Block 150 may further comprise more than one execution instance running at the same time. For example, multiple threads running simultaneously, on possibly, multi-core processor hardware. In another embodiment of the invention, block 150 may comprise multiple hardware modules, each of which is capable of performing validation of elements in a fragment. Block 150 may further comprise multiple execution instances running independently of one another at the same time.

Block 160 may perform the task of validating elements which may have been partially validated by block 150. Block 160 may use the validation summary table entries as input. As shown in exemplary entries 210 and 220 of FIG. 2, the validation summary table may contain sufficient information required to complete validation of partially validated elements. For example, a case may arise where in order to complete the validation of an element in fragment N, data in fragment N+1 is required. In this scenario, block 150 may create entries in the validation summary table reflecting the validation state and context of both fragment N and fragment N+1, possibly enabling block 160 to complete the task of validating the element which block 150 may have been unable to validate.

Reference is now made to FIG. 4 which shows an exemplary pseudo code implementation of block 160, the code may require as input a partially validated element state entry (PVElemList), as shown by 210 in FIG. 2B and a fragmented validation summary entry (ValSum) as shown by 220 in FIG. 2C. The code may update the validation summary table.

Since the validation summary table may contain enough information regarding the validation state and/or context of a given fragment to enable block 160 to complete the validation of that fragment, the actual fragment's data may be released from memory, possibly by block 150. Releasing the memory used for storing a fragment immediately after validation may serve to lower the amount of memory required for the validation of a document, mainly due to the fact that the entire document need not be kept in memory through the entire validation process.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the spirit of the invention.

What is claimed is:

1. A method comprising:
dividing into two or more document fragments a document comprising elements to be validated;
for each of said document fragments, validating elements having terminal tags in said document fragment;
validating elements having terminal tags in different document fragments; and
storing partial validation summary information pertaining to elements having terminal tags in different document fragments.

2. The method of claim 1, wherein validating elements having terminal tags in said document fragment comprises simultaneously validating a plurality of said document fragments.

3. The method of claim 1, further comprising storing said document fragments in memory during validation and freeing memory used for storing said document fragments after validation of each of said document fragments.

4. The method of claim 1, wherein dividing said document into said fragments comprises parsing said document to identify element names and attributes in said document and storing said identified element names and attributes.

5. The method of claim 1, wherein dividing said document into said fragments comprises creating fragments beginning with a start tag of an element.

6. The method of claim 5, wherein dividing said document into said fragments further comprises attaching an element descriptor of the first element in a fragment to each of said fragments.

7. The method of claim 1, wherein validating elements having terminal tags in different document fragments comprises validating said elements using element information in a first document fragment containing a first terminal tag of said element and said partial validation summary information based on a second document fragment containing a second terminal tag of said element.

8. An article of manufacture for use in a computer system, the article of manufacture comprising a computer usable medium having computer readable program code means embodied in the medium, the program code including computer readable program code that when executed causes a computer to:

divide into two or more document fragments a document comprising elements to be validated;

validate elements having terminal tags in said document fragment;

validate elements having terminal tags in different document fragments; and store partial validation summary information pertaining to elements having terminal tags in different document fragments.

9. The article of claim 8, wherein said program code when executed causes said computer to validate elements having terminal tags in said document fragments by simultaneously validating a plurality of said document fragments.

10. The article of claim 8, wherein said program code when executed further causes said computer to store said document fragments in memory during validation and free memory used for storing said document fragments after validation of each of said document fragments.

11. The article of claim 10, wherein said program code when executed causes said computer to divide said document into said fragments by parsing said document to identify element names and attributes in said document and storing said identified element names and attributes.

12. The article of claim 8, wherein said program code when executed causes said computer to divide said document into said fragments by creating fragments beginning with a start tag of an element.

13. The article of claim 12, wherein said program code when executed causes said computer to divide said document into said fragments by attaching an element descriptor of the first element in a fragment to each of said fragments.

* * * * *